United States Patent Office 3,466,280
Patented Sept. 9, 1969

3,466,280
3-AMINO-5,5-DIHALO-6-ALKYL-6-ALKOXY HYDROURACILS
Harvey M. Loux, Hockessin, Del., assignor to E. I. du Pont de Nemours and Company, Wilmington, Del., a corporation of Delaware
No Drawing. Original application Dec. 13, 1967, Ser. No. 690,078, now Patent No. 3,406,023, dated Oct. 15, 1968. Divided and this application May 20, 1968, Ser. No. 730,655
Int. Cl. C07d 51/30, 51/16, 57/00
U.S. Cl. 260—247.2                    10 Claims

ABSTRACT OF THE DISCLOSURE

Novel hydrouracils of the following formula:

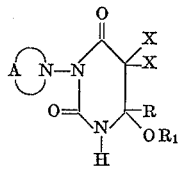

wherein X, R, $R_1$ and

are as defined hereinafter are useful as herbicides.
Exemplary of such compounds is 5,5-dichloro-3-(hexahydro-1-azepinyl)-6-methoxy-6-methylhydrouracil.

CROSS REFERENCE TO RELATED APPLICATIONS

This application is a divisional application of my copending application, Ser. No. 690,078, filed Dec. 13, 1967, which application is a continuation-in-part application of my then copending application Ser. No. 590,545, filed Oct. 31, 1966, now abandoned, which in turn is a continuation-in-part of my then copending application Ser. No. 416,628, filed Dec. 7, 1964, now abandoned, which in turn is a continuation-in-part application of my then copending application Ser. No. 159,768, filed Dec. 15, 1961, now abandoned.

BRIEF SUMMARY OF THE INVENTION

This invention relates to a novel class of hydrouracils and to compositions and methods for using these hydrouracils as herbicides.
The hydrouracils of this invention are represented by the following formula:

(1)
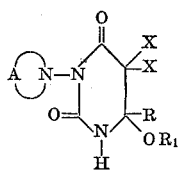

wherein

is a cycloimino group selected from the group consisting of monocyclic heterocyclic groups containing from 3 through 8 ring atoms and bicyclic heterocyclic groups containing 7 through 12 ring atoms; provided that the cycloimino group must contain one nitrogen atom bonding the group to the uracil nucleus; provided that the cycloimino group can contain 0 to 2 additional hetero atoms selected from the group consisting of oxygen, nitrogen and sulfur; and further provided that the cycloimino group can be substituted with a member selected from the group consisting of hydroxy, alkyl of 1 through 4 carbon atoms, and hydroxyalkyl of 1 through 4 carbon atoms; X is chlorine or bromine; R is methyl or ethyl; $R_1$ is hydrogen or alkyl of 1 through 4 carbon atoms; provided that when $R_1$ is alkyl, X is chlorine, and when $R_1$ is hydrogen, X is bromine.

Preferred in view of the ease in obtaining starting materials are the compounds within the above scope where

is azacycloalkyl of 3 through 8 ring atoms, azacycloalkenyl of 5 through 7 ring atoms, azabicycloalkyl of 7 through 11 ring atoms, diazacycloalkyl of 5 through 8 ring atoms, azabicycloalkenyl of 9 through 11 ring atoms, thiacycloalkyl of 5 through 8 ring atoms, azathiacycloalkenyl of 5 through 8 ring atoms, diazabicycloalkenyl of 7 through 11 ring atoms, azaoxabicycloalkyl of 8 through 10 ring atoms, azaoxabicycloalkenyl of 9 through 11 ring atoms, azadioxacycloalkyl of 5 through 8 ring atoms, azathiacycloalkyl of 5 through 7 ring atoms, azadithiacycloalkyl of 5 through 8 ring atoms, azathiacycloalkenyl of 5 through 7 ring atoms, azathiabicycloalkyl of 9 and 10 ring atoms, or azathiabicycloalkenyl of 9 and 10 ring atoms.

As previously set forth, these groups must have a nitrogen atom bonding the group to the uracil nucleus, can contain 1 or 2 additional hetero atoms, and can be substituted with hydroxy, alkyl of 1 through 4 carbon atoms, or hydroxyalkyl of 1 through 4 carbon atoms.

With respect to the above group, it is of course understood that they can conventionally be named in other ways. Thus, 1,3-diazabicyclo(3.4.0) nona-2,4,6,8-tetraen-1-yl, i.e., an azabicycloalkenyl group is conventionally termed 1-benzimidazolyl.

Most preferred are the compounds where

is azacycloalkyl of 5 through 7 ring atoms or azaoxacycloalkyl of 5 through 6 ring atoms, the groups being substituted with 0 through 4 methyl groups and containing 1 or 2 hetero atoms.

Exemplary of such compounds are:

5,5-dichloro-3-(hexahydro-1-azepinyl)-6-methoxy-6-methylhydrouracil
5,5-dibromo-6-hydroxy-6-methyl-3-(1-piperidino)-hydrouracil
5,5-dichloro-6-methoxy-6-methyl-3-(1-piperidino)-hydrouracil
5,5-dibromo-6-hydroxy-6-methyl-3-(1-pyrrolidinyl)-hydrouracil
5,5-dichloro-6-methoxy-6-methyl-3-(1-pyrrolidinyl)-hydrouracil
5,5-dibromo-3-(hexahydro-1-azepinyl)-6-hydroxy-6-methylhydrouracil
5,5-dichloro-6-methoxy-6-methyl-3-(1-piperazinyl)-hydrouracil
5,5-dichloro-6-methoxy-6-methyl-3-(4-morpholino)-hydrouracil As is well known in the art, herbicidal compounds frequently are utilized in the form of a herbicidal equivalent derivative thereof for some formulating or handling advantage the derivative may provide over the compound per se. Similarly, it is to be understood that also included within the scope of this invention are addition compounds or complexes of the hydrouracils of Formula 1 which can be formed from Lewis acids and which exert a herbicidal effect similar to that of the hydrouracils per se. Lewis acids are generally described in the following texts: (1) J. Hine, Physical Organic Chemistry, McGraw-Hill Book Company, Inc., New York, 1956, chapter 2; (2) W. F. Luder and S. Zuffanti, The Electronic Theory of Acids and Bases, John Wiley and Sons, Inc., New York, 1946; (3) E. S. Gould, Mechanism and Structure in Organic Chemistry, Holt, Rinehart and Winston, New York, 1959, chapter 4; (4) E. M. Arnett, Progress in Physical Organic Chemistry, vol. 1, edited by S. G. Cohen, A. Streitwieser, Jr., and R. W. Taft, Interscience Publishers, Inc., New York, 1963, chapter entitled "Quantitative Comparisons of Weak Organic Bases"; and (5) G. A. Olah, editor, Friedel-Crafts and Related Reactions, vols. 1 and 2, Interscience Publishers, Inc., New York, 1963.

Non-limiting illustrations of compounds shown in the above texts which can be used to form addition compounds or complexes with the hydrouracils of Formula 1 for purposes of the present invention are: phenols, cresols, naphthols, Friedel-Crafts catalyst, halogenated benzoic acids, mineral acids, organic sulfonic acids, organic aliphatic acids, halogenated aliphatic acids, aromatic acids, and halogenated aryloxyaliphatic acids.

Preferred for use according to the invention due to their economical effectiveness as herbicides are hydrouracils within the scope of Formula 1 wherein X is chlorine and $R_1$ is alkyl of 1 through 2 carbon atoms and R is methyl.

In Formula 1, the

cycloimino group in the 3-position of the hydrouracil ring can include but is not limited to such groups as

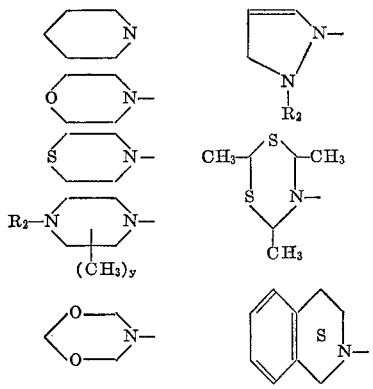

where $R_2$ is alkyl of 1 through 4 carbon atoms or

—$CH_2CH_2OH$ and y is 0–4. It is obvious from the above that the term "cycloimino" as used herein includes hetero atoms but it is intended in accordance with the invention that the number of hetero atoms in the

group of the 3-position of the uracil ring does not exceed three and they are oxygen, nitrogen, or sulfur.

DESCRIPTION OF THE INVENTION

Those compounds of Formula 1 are prepared by halogenation in the appropriate solvent of uracils of the following structure:

(2)

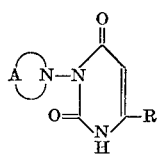

where

and R are as described above. The synthesis of these starting uracils is described in my copending application Ser. No. 416,623, filed Dec. 7, 1964, now abandoned.

A suitable method for preparing the starting uracils is illustrated by the following equations:

(1)

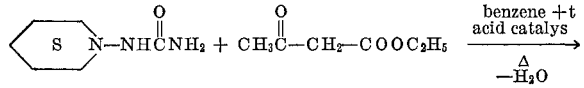

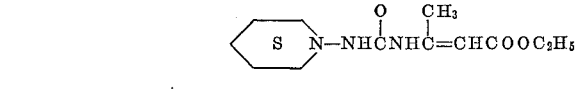

(2)

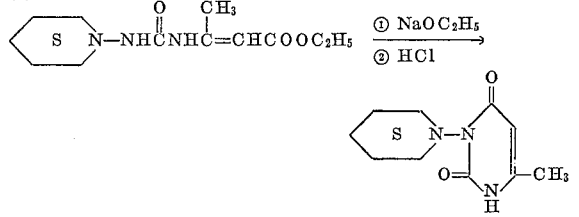

The semicarbazide used as a starting material in Equation 1 above can be prepared according to Ann., 221, 304 (1883) or Ber., 35, 4477 (1902).

The appropriately substituted urea is treated with a β-keto ester or an α-substituted β-keto ester substituted with such radicals as alkoxy, fluorine, or alkyl, and an acid catalyst, at reflux in a solvent from which water is removed continuously. After the water has all been removed, a methanolic solution of a base such as sodium methoxide is added. After a few minutes reflux, the reaction mixture is cooled and extracted with water. Upon acidification of the water layer, the desired product separates in crystalline form.

The product formed at the end of the first step, i.e., after the water has been removed, is a ureido compound. It can be isolated and purified if desired; however, this is neither necessary nor advantageous for the operation of step 2.

These ureido compounds referred to above are believed to exist in either or both of two tautomeric forms, as illustrated in the following equation:

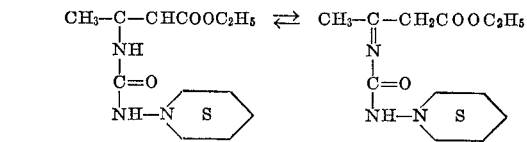

Those compounds of Formula 1 having X=chlorine and $R_1$=alkyl or 1 through 4 carbon atoms are prepared by adding chlorine slowly at 0–20° C. to a stirred solution of the starting uracil in the appropriate alcohol (3).

(3)

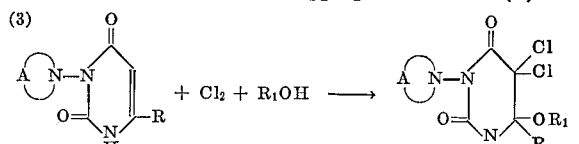

Those compounds of Formula 1 in which X is bromine and $R_1$ is hydrogen are prepared by adding bromine gradually at room temperatures to a stirred slurry of the starting uracil in water (4).

(4)

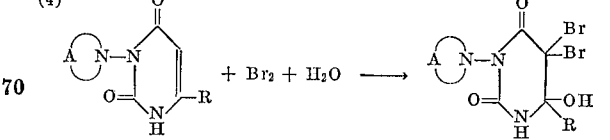

The hydrouracils of this invention have outstanding herbicidal effectiveness. They are particularly active as post-emergence sprays at levels of from about 3 to 45 pounds of active material per acre for the control of annual grasses and broadleaf weeds, especially perennial grasses such as Johnson grass, quack grass, Bermuda grass, and nut sedge growing on railroad ballast, on industrial sites, or on and adjacent to cropland in agricultural areas. They are also useful for the post- and pre-emergence control of annual grass and broadleaf seedlings when used as a spray at a rate of about ½ to 4 pounds per acre. Still another important use for the compounds of this invention is for pre-emergence and post-emergence control of a wide spectrum of weeds and brush on industrial and railroad ballast sites using levels of about 5 to 45 pounds of active material per acre.

In general, one uses the compounds of this invention at levels of at least about ¼ pound of active material per acre to obtain herbicidal effectiveness, the exact amount used being dependent upon the particular situation involved.

The compounds of this invention are preferably formulated with pest-control adjuvants, modifiers, or diluents, hereinafter generically called inert carriers. Formulation facilitates handling and often actually enhances herbicidal action. Such herbicidal formulations are prepared in the form of either powdered solids, granules, pellets, or liquids.

The liquid compositions, whether solutions or dispersions of the compounds of this invention in a liquid solvent, and also the wettable powders, contain as a conditioning agent one or more surface-active agents in amounts sufficient to render a given composition containing the compounds of this invention readily dispersible in water or in oil. By the term "surface-active agent," it is understood that wetting agents, dispersing agents, suspending agents, and emulsifying agents are included.

Surface active agents suitable for use in the compositions of this invention are set forth, for example, in Searle, U.S. Patent No. 2,426,417; Todd, U.S. Patent No. 2,655,-447; or Jones, U.S. Patent No. 2,412,510. See also Lenher et al., U.S. Patent No. 2,139,276. A detailed list of surface-active agents is set forth in McCutcheon, "Detergents and Emulsifiers," 1966 Annual.

Preferred wetting agents are alkylene-benzene and alkyl-naphthalene sulfonates, sulfated fatty alcohols, amines or acid amides, esters of sodium sulfosuccinates, petroleum sulfonates, sulfonated vegetable oils, polyethioylated long chain alcohols and substituted phenols.

Preferred dispersants are methyl cellulose, polyvinyl alcohols, sodium lignin sulfonates, polymeric alkylnaphthalene sulfonates, and sodium-N-methyl-N-(long chain acid) tomates.

In preparing herbicidal compositions, surface-active agents are generally employed at concentrations of from about 1–10%, by weight. Levels as high as 0.5 to 6 parts for each part of hydrouracil, however, give unusual and unexpected beneficial results. Such compositions have a greater herbicidal effectiveness than can be expected from a consideration of the activity of the components used separately.

Powdered or dust compositions of the invention, whether or not also modified with a surface-active agent, are prepared by mixing the active ingredient with finely divided inert solid carriers. Such carriers are preferably talcs, natural clays, pyrophyllite, diatomaceous earth, and flours such as walnut shell, wheat, redwood, soya bean, and cottonseed. Other inert solid carriers which can be used include magnesium and calcium carbonates, calcium phosphates, sulfur, lime, etc., either in powder or granular form. The percentage by weight of the active ingredient will vary according to the manner in which the composition is to be applied, but in general, will be from about 0.5 to 95% by weight of the herbicidal composition.

Granule or pellet compositions can be prepared by mixing the active material in finely divided form with clays (with or without water soluble binders), moistening the mixture with 15–20% water, extruding the mass under pressure through an orifice, then cutting the extrusions to size before drying to yield pellets or first drying, then granulating to yield granules. Alternatively granules, but usually not pellets, can be made by spraying active material in solution or suspension upon the surface of a preformed granule of clay, vermiculite, or other suitable granular material. When the active material is soluble in the spray medium so it can penetrate into the pores of the granular carrier no binding agent is needed. When it is insoluble and suspended, a binder is needed to adhere the active material to the surface. The binder can be soluble such as goulac, or dextrin or colloidally soluble such as swollen starch, glue or polyvinyl alcohol. The final step in either case is to remove the liquid medium, whether solvent or carrier. The percentage of the active ingredient may vary from 1–80% but is usually 3–25% of the herbicidal composition.

Herbicidal compositions of this invention can also be prepared by dispersing the active ingredient in an aqueous or inert non-aqueous carrier. Aliphatic hydrocarbons and hydrocarbons of petroleum origin are preferred as non-aqueous carriers. These dispersions are prepared by milling the uracils with dispersing agents and suspending agents and inert carriers in mills such as pebble or sand mills. The amount of the herbicide in the dispersion may be from 10% or less to 50% of the aqueous or oil dispersion.

The particles in such dispersions may range from about 0.1 to 50 microns although the majority are preferably in the range of from about 0.5–5 microns in average diameters. In general, the oils used are aliphatic hydrocarbons and mixtures thereof, particularly those derived from petroleum and having a boiling point in the range from about 125 to 400° C. A hydrocarbon oil having a lower boiling point is less desirable because when sprayed from a nozzle, such a hydrocarbon tends to volatilize undesirably. Furthermore, low-boiling hydrocarbons present a serious fire hazard.

Emulsifiable oils are usually solutions of active material in non-water miscible solvents together with a surfactant.

For the compounds of this invention, emulsifiable oils can be made by mixing the active ingredient with a solvent and surfactant. Suitable solvents for the compounds of this invention are aromatic hydrocarbons (substituted or unsubstituted), and non-water miscible ethers, esters, or ketones. Suitable surfactants are those anionic or non-ionic agents known to the art as emulsifying agents. Such compounds can be found listed by J. B. McCutcheon in Detergents and Emulsifiers—1966 Annual.

Emulsifying agents most suitable for the compositions of this invention are alkyl aryl polyethoxy alcohols, alkyl and alkyl aryl polyether alcohols, polyoxyethylene sorbitol or sorbitan fatty acid esters, polyethylene glycol fatty esters, fatty alkylol amide condensates, amine salts of fatty alcohol sulfates plus long chain alcohols and oil soluble petroleum sulfonates. Such emulsifying agents will comprise from about 3–10 weight percent of the total composition. As described above, however, up to 6 parts of emulsifying agent for each part of hydrouracil can be used to give synergistic results.

Thus, emulsifiable oil compositions of the present invention will consist of from about 25–70 weight percent hydrouracil or hydrouracil-phenol complex, about 20–72 weight percent solvent, and about 3–10 weight percent emulsifier, as these terms are defined and used above.

In some situations it is desirable that the active hydrouracil herbicide be released slowly from a carrier. Such compositions are particularly useful for application to gravel and cinder driveways and the like, where they release their herbicidal ingredients slowly over a long period of time and thus eliminate the necessity for frequent application.

Such compositions are made by incorporating the hydrouracil into a solid or semi-solid matrix of a material such as portland cement or calcium sulfate. The hydrouracils will be present in these compositions in varying concentrations depending upon the ultimate use of the products. Generally, they will contain from 1% to 40%, by weight, of hydrouracil. They can be prepared by any of the well-known techniques, such as granulating or pelletizing.

Herbicidal formulations can also be prepared containing a fungicide or bactericide. When such compositions are applied to the soil, the fungicidal or bactericidal ingredients retard the breakdown of the uracils by soil microorganisms and thus renders them stable over a longer period of time. The fungicides and bactericides which can be incorporated into these compositions can be any of the well-known products such as, for example, antibiotics such as penicillin, phenols, thiocarbamates, and the like. The amount of microbiocide to be included in such compositions will naturally vary with their ultimate use. Generally, however, they will contain from 1% to 70% of a microbiocide.

The hydrouracils of this invention can also be incorporated into paints, particularly marine paints, for application to surfaces where the growth of plants such as algae is undesirable. Such compositions are prepared by dissolving or suspending the hydrouracil in a paint-compatible solvent. Hydrouracils will be present in such compositions at concentrations of from 1% to 10%.

The hydrouracils and hydrouracil-phenol complexes of this invention can also be dissolved in a suitable solvent or dispersed in a suitable carrier, and impregnated into wooden objects such as construction timbers or railroad ties. When these objects are placed in or near the ground, the uracils slowly leach from them, thus preventing the growth of weeds in the nearby areas.

Such wooden objects can also be floated on the surface of water in which undesirable aquatic growth is present. Again, the uracil is slowly leached from the wood and prevents growth of nearby aquatic weeds for extended periods.

The concentration of hydrouracils to be impregnated into any such wooden object will vary according to the nature of the wood and the type of weed to be controlled.

Optionally, adhesives such as gelatin, blood albumin, resins, for example, rosin alkyl resins and the like can also be used in certain compositions to increase retention or tenacity of deposits following application.

The herbicidal compositions of this invention can be formulated to contain two or more of the hydrouracils. They can also be formulated to contain other known herbicides in addition to the hydrouracils.

Among the known herbicides which can be combined with the hydrouracils of this invention are:

Substituted ureas 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea These ureas can be mixed with the hydrouracils of this invention in proportions of from 1:4 to 4:1, respectively, the preferred ratio being 1:2 to 2:1.

Substituted triazines 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-methoxy-4-ethylamino-6-isopropylamino-s-triazine
2-chloro-4,6-bis(isopropylamino)-s-triazine These triazines can be mixed with the hydrouracils of this invention in proportions of from 1:4 to 4:1, respectively, the preferred ratio being 1:2 to 2:1.

Phenols

Dinitro-o-sec-butylphenol and its salts
Pentachlorophenol and its salts

These phenols can be mixed with the hydrouracils of this invention in the proportions of 1:10 to 20:1, respectively, the preferred ratio being 1:5 to 5:1.

Carboxylic acids and derivatives

These carboxylic acids and derivatives can be mixed with the hydrouracils of this invention in the listed proportions.

2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
3-amino-2,5-dichlorobenzoic acid and its salts
3-nitro-2,5-dichlorobenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters
4-(2-methyl-4-chlorophenoxy)butyric acid and its salts and esters Mixed in a 1:16 to 8:1 ratio, preferably a 1:4 to 4:1 ratio.

2,6-dichlorobenzonitrile

Mixed in a 1:4 to 4:1 ratio, preferably a 1:3 to 3:1 ratio.

Trichloroacetic acid and its salts

Mixed in a 1:2 to 25:1 ratio, preferably a 1:1 to 8:1 ratio.

2,2-dichloropropionic acid and its salts

Mixed in a 1:4 to 8:1 ratio, preferably a 1:2 to 4:1 ratio.

N,N-dipropylthiocarbamic acid, ethyl ester
n-Propyl-N,N-di-propylthiolcarbamate
n-Propyl-N-ethyl-n-butylthiolcarbamate Mixed in a 1:2 to 24:1 ratio, preferably a 1:1 to 12:1 ratio.

N-phenylcarbamic acid, isopropyl ester
N-(m-chlorophenyl)carbamic acid, isopropyl ester
N-(m-chlorophenyl)carbamic acid, 4-chloro-2-butynyl ester Mixed in a 1:2 to 24:1 ratio, preferably a 1:1 to 12:1 ratio.

2,3,6-trichlorophenylacetic acid and its salts

Mixed in a 1:12 to 8:1 ratio, preferably a 1:4 to 4:1 ratio.

2-chloro-N,N-diallylacetamide
Maleic hydrazide

Mixed in a 1:2 to 10:1 ratio, preferably a 1:1 to 5:1 ratio.

Inorganic and mixed inorganic-organic salts

These salts can be mixed with the hydrouracils of this invention in the listed proportions.

Calcium propylarsonate
Disodium monomethylarsonate
Octyl-dodecylammoniummethylarsonate Mixed in a 1:4 to 4:1 ratio, preferably a 1:2 to 2:1 ratio.

Sodium arsenite

Mixed in a 1:5 to 40:1 ratio, preferably a 1:4 to 25:1 ratio.

Lead arsenate
Calcium arsenate

Mixed in a 150:1 to 600:1 ratio, preferably a 100:1 to 400:1 ratio.

Sodium tetraborate hydrated, granulated
Sodium metaborate
Sodium pentaborate
Polyborchlorate
Unrefined borate ore such as borascu Mixed in a 6:1 to 1500:1 ratio, preferably a 3:1 to 1000:1 ratio.

Sodium chlorate

Mixed in a 2:1 to 40:1 ratio, preferably a 1:1 to 20:1 ratio.

Ammonium sulfamate

Mixed in a 1:1 to 100:1 ratio, preferably 1:1 to 50:1 ratio.

Other organic herbicides 5,6-dihydro-(4A,6A)-dipyrido-(1,2-A,2',1'-C) pyrazinium dibromide
1,1'-dimethyl-4,4'-dipyridinium di-(methylsulfate)

Mixed in a 1:20 to 16:1 ratio, preferably a 1:5 to 5:1 ratio.

3-amino-1,2,4-triazole

Mixed in a 1:20 to 20:1 ratio, preferably a 1:5 to 5:1 ratio.

3,6-endoxohexahydrophthalic acid

Mixed in a 1:3 to 20:1 ratio, preferably a 1:2 to 10:1 ratio.

Hexachloroacetone

Mixed in a 1:2 to 16:1 ratio, preferably a 1:1 to 8:1 ratio.

Diphenylacetonitrile
N,N-dimethyl-α,α-diphenylacetamide
N,N-di-n-propyl-2,6-dinitro-4-trifluoromethylaniline
N,N-di-n-propyl-2,6-dinitro-4-methylaniline Mixed in a 1:10 to 30:1 ratio, preferably a 1:5 to 20:1 ratio.

O-(2,4-dichlorophenyl)-O-methyl-isopropylphosphoramidothiate
2,3,5,6-tetrachloroterephthalic acid, dimethyl ester Mixed in a 1:4 to 20:1 ratio, preferably a 1:3 to 15:1 ratio.

Substituted uracils

These hydrouracils can be mixed with substituted uracils, in the proportions listed below. Methods for the preparation of the listed uracils which are novel can be found in copending application Ser. Nos. 233,952, filed Oct. 29, 1962, now abandoned, and 232,311, filed Oct. 22, 1962, now U.S. Patent 3,235,360.

3-cyclohexyl-6-methyluracil
3-cyclohexyl-6-ethyluracil
3-cyclohexyl-6-sec-butyluracil
3-norbornyl-6-methyluracil
3-cyclopentyl-6-methyluracil
3-cyclohexyl-6-isopropyluracil Mixed in a 1:4 to 4:1 ratio, preferably a 1:2 to 2:1 ratio.

3-cyclohexyl-5,6-trimethyleneuracil
3-sec-butyl-5,6-trimethyleneuracil
3-isopropyl-5,6-trimethyleneuracil
3-isopropyl-5,6-tetramethyleneuracil
3-isopropyl-5,6-pentamethyleneuracil Mixed in a 1:6 to 6:1 rato, preferably a 1:4 to 4:1 ratio.

3-cyclohexyl-5-bromouracil
3-cyclohexyl-5-chlorouracil
3-isopropyl-5-bromouracil
3-sec-butyl-5-bromouracil
3-sec-butyl-5-chlorouracil
5-bromo-3-sec-butyl-6-methyluracil
5-bromo-3-sec-butyl-6-methyluracil, sodium salt
5-chloro-3-sec-butyl-6-methyluracil
5-bromo-3-tert-butyl-6-methyluracil
5-chloro-3-tert-butyl-6-methyluracil
5-bromo-3-(1-ethylpropyl)-6-methyluracil
5-chloro-3-(1-ethylpropyl)-6-methyluracil
5-bromo-3-isoprpoyl-6-methyluracil
5-chloro-3-isopropyl-6-methyluracil
5-bromo-3-isopropyl-6-methyluracil
5-bromo-3-cyclohexylmethyl-6-methyluracil
5-chloro-3-cyclohexylmethyl-6-methyluracil
3-cyclohexyl-5-methoxy-6-methyluracil
3-sec-butyl-5,6-dimethyluracil
5-bromo-6-methyl-3-norbornylmethyluracil
3-sec-butyl-6-methyl-5-nitrouracil
3-cyclohexyl-5,6-dimethyluracil
5-bromo-3-cyclohexyl-6-methyluracil
5-chloro-3-phenyl-6-methyluracil Mixed in a 1:6 to 6:1 ratio, preferably a 1:2 to 2:1 ratio.

3-isopropyl-1-trichloromethylthio-5-bromo-6-methyluracil
3-cyclohexyl-1-trichloromethylthio-5-bromo-6-methyluracil
3-sec-butyl-1-acetyl-5-bromo-6-methyluracil
3-isopropyl-1-acetyl-5-bromo-6-methyluracil
3-isopropyl-1-trichloromethylthio-5-chloro-6-methyluracil Mixed in a 1:4 to 4:1 ratio, preferably a 1:2 to 2:1 ratio.

The rate of applications for compounds of this invention will, of course, vary with the particular end result desired, the particular use to which the compounds are put, the particular plant involved, the formulation used, the mode of application, the prevailing weather conditions, the foliage density, and the like. Since so many variables play a role, it is not possible to indicate generally a particular rate of application suitable for all situations. Certain particular usage rates that are found to be effective can be suggested, but it must be understood the determination of the optimum particular rate for use in any given instance is conventional procedure to those skilled in the art.

In order that the invention may be better understood, the following examples are given, wherein all parts and proportions are by weight unless indicated otherwise.

Example 1.—5,5-dichloro-3-(hexahydro - 1 - azepinyl)-6-methoxy-6-methyl-hydrouracil A solution of 8.92 parts by weight of 3-(hexahydro-1 - azepinyl-6-methyluracil in 50 parts of methanol is stirred at 15–20° C. while 5.68 parts by weight of chlorine is slowly added. The reaction is quite exothermic during the first half of the clorine addition, making external cooling necessary. The solution is stirred 1½ hours longer, then the excess methanol is removed under reduced pressure. The residue consists of 10.8 parts of 5,5-dichloro-3-(hexahydro - 1 - azepinyl)-6-methoxy - 6-methylhydrouracil. It is sufficiently pure for herbicidal formulation, but may be purified, if desired, by recrystallization from nitromethane.

By substituting equivalent amounts of the appropriate starting uracil and alcohol for the 3-(hexahydro-1-azepinyl)-6-methyluracil set forth above, the hydrouracils listed in Table I can be prepared.

TABLE I

| Starting uracil | Alcohol | Hydrouracil product |
| --- | --- | --- |
| 3-(hexahydro-1-azepinyl)-6-ethyluracil | Methanol | 5,5-dichloro-6-ethyl-3-(hexahydro-1-azepinyl)-6-methoxyhydrouracil. |
| 6-methyl-3-(4-morpholino)uracil | do | 5,5-dichloro-6-methoxy-6-methyl-3-(4-morpholino)hydrouracil. |
| 3-(hexahydro-1-azepinyl)-6-methyluracil. | Butanol | 6-butoxy-5,5-dichloro-3-(hexahydro-1-azepinyl)-6-methylhydrouracil. |
| 6-methyl-3-(1-piperidino)uracil | Ethanol | 5,5-dichloro-6-ethoxy-6-methyl-3-(1-piperidino)-hydrouracil. |
| Do | Methanol | 5,5-dichloro-6-methoxy-6-methyl-3-(1-piperidino)-hydrouracil. |
| 6-methyl-3-(1-pyrrolidinyl)uracil | Propanol | 5,5-dichloro-6-methyl-6-propoxy-3-(1-pyrrolidinyl)hydrouracil. |
| 3-(dihydro-1,3,5-dithiazin-5-yl)-6-methyluracil. | Isopropanol | 5,5-dichloro-3-(dihydro-1,3,5-dithiazin-5-yl)-6-methyl-6-isopropoxyhydrouracil. |
| 3-(dihydro-2,4,6-trimethyl-1,3,5-dithiazin-5-yl)-6-methyluracil. | Ethanol | 5,5-dichloro-3-(dihydro-2,4,6-trimethyl-1,3,5-dithiazin-5-yl)-6-ethoxy-6-ethyluracil. |
| 6-methyl-3-(1,2,3,6-tetrahydro-1-pyridyl)uracil. | Methanol | 5,5-dichloro-6-methoxy-6-methyl-3-(1,2,3,6-tetrahydro-1-pyridyl)hydrouracil. |
| 6-ethyl-3-(4-methyl-1-piperazinyl)uracil. | do | 5,5-dichloro-6-ethyl-6-methoxy-3-(4-methyl-1-piperazinyl)hydrouracil. |
| 6-methyl-3-(2-methyl-1-piperidino)uracil. | Propanol | 5,5-dichloro-6-propoxy-6-methyl-3-(2-methyl-1-piperidino)hydrouracil. |
| 6-methyl-3-(1-piperazinyl)uracil | Methanol | 5,5-dichloro-6-methoxy-6-methyl-3-(1-piperazinyl)hydrouracil. |
| 6-ethyl-3-(2-methyl-4-pyrazolin-1-yl)uracil. | Ethanol | 5,5-dichloro-6-ethoxy-6-ethyl-3-(2-methyl-4-pyrazolin-1-yl)hydrouracil. |
| 6-methyl-3-(tetrahydro-1,4-thiazin-4-yl)uracil. | Butanol | 6-butoxy-5,5-dichloro-6-methyl-3-(tetrahydro-1,4-thiazin-4-yl)hydrouracil. |
| 3-(dihydro-1,3,5-dioxazin-5-yl)-6-methyluracil. | Methanol | 5,5-dichloro-3-(dihydro-1,3,5-dioxazin-5-yl)-6-methoxy-6-methylhydrouracil. |
| 6-ethyl-3-(1,2,3,4-tetrahydro-2-isoquinolyl)uracil. | Ethanol | 5,5-dichloro-6-ethoxy-6-ethyl-3-(1,2,3,4-tetrahydro-2-isoquinolyl)hydrouracil. |
| 3-[4-(2-hydroxyethyl)-1-piperazinyl]-6-methyluracil. | Methanol | 5,5-dichloro-3-[4-(2-hydroxyethyl)-1-piperazinyl]-6-methoxy-6-methylhydrouracil. |
| 6-methyl-3-(2-methyl-1-aziridinyl)uracil. | do | 5,5-dichloro-6-methoxy-6-methyl-3-(2-methyl-1-aziridinyl)hydrouracil. |
| 6-methyl-3-(2,3,5,6-tetramethyl-1-piperazinyl)uracil. | do | 5,5-dichloro-6-methoxy-6-methyl-3-(2,3,5,6-tetramethyl-1-piperazinyl)hydrouracil. |
| 3-[2-(3-hydroxypropyl)-2-methyl-1-pyrrolidinyl]-6-methyluracil. | do | 5,5-dichloro-3-[2-(3-hydroxypropyl)-2-methyl-1-pyrrolidinyl]-6-methoxy-6-methylhydrouracil. |
| 6-methyl-3-(1-pyrrolyl)uracil | Ethanol | 5,5-dichloro-6-ethoxy-6-methyl-3-(1-pyrrolyl)-hydrouracil. |
| 3-(1-aziridinyl)-6-methyluracil | do | 3-(1-aziridinyl)-5,5-dichloro-6-methoxy-6-methylhydrouracil. |
| 3-(dihydro-2,4,6-trimethyl-1,3,5-dithiazin-5-yl)-6-methyluracil. | do | 5,5-dichloro-3-(dihydro-2,4,6-trimethyl-1,3,5-dithiazin-5-yl)-6-ethoxy-6-methylhydrouracil. |
| 3-(octahydro-1-azocinyl)-6-methyluracil | do | 5,5-dichloro-6-ethoxy-3-(octahydro-1-azocinyl)-6-methylhydrouracil. |
| 3-(1-azepinyl)-6-methyluracil | Methanol | 3-(1-azepinyl)-5,5-dichloro-6-methoxy-6-methylhydrouracil. |
| 3-(decahydro-1-quinolyl)-6-methyluracil | do | 5,5-dichloro-3-(decahydro-1-quinolyl)-6-methoxy-6-methylhydrouracil. |
| 3-(11-azabicyclo[4.4.1]undec-11-yl)-6-methyluracil. | do | 3-(11-azabicyclo[4.4.1]undec-11-yl)-5,5-dichloro-6-methoxy-6-methylhydrouracil. |
| 3-(11-azabicyclo[4.4.1]undec-1-en-11-yl)-6-methyluracil. | do | 3-(11-azabicyclo[4.4.1]undec-1-en-11-yl)-5,5-dichloro-6-methoxy-6-methylhydrouracil. |
| 6-methyl-3-(2-methyl-3-oxazolidinyl)uracil. | Isopropanol | 5,5-dichloro-6-isopropoxy-6-methyl-3-(2-methyl-3-oxazolidinyl)hydrouracil. |
| 3-(hexahydro-2H-1,5-oxazocin-5-yl)-6-methyluracil. | Methanol | 5,5-dichloro-3-(hexahydro-2H-1,5-oxazocin-5-yl)-6-methoxy-6-methylhydrouracil. |
| 6-methyl-3-(4-oxazolin-3-yl)uracil | do | 5,5-dichloro-6-methoxy-6-methyl-3-(4-oxazolin-3-yl)hydrouracil. |
| 6-methyl-3-(8-oxa-3-azabicyclo[3.2.1]oct-3-yl)uracil. | Ethanol | 5,5-dichloro-6-ethoxy-6-methyl-3-(8-oxa-3-azabicyclo[3.2.1]oct-3-yl)-6-methylhydrouracil. |
| 6-methyl-3-(octahydro-2H-1,3-benzoxazin-3-yl)uracil. | do | 5,5-dichloro-6-ethoxy-6-methyl-3-(octahydro-2H-1,3-benzoxazin-3-yl)hydrouracil. |
| 3-(3-benzoxazolinyl)-6-methyluracil | do | 3-(3-benzoxazolinyl)-5,5-dichloro-6-ethoxy-6-methylhydrouracil. |
| 3-(3,4-dihydro-2H-1,3-benzoxazin-3-yl)-6-methyluracil. | Methanol | 5,5-dichloro-3-(3,4-dihydro-2H-1,3-benzoxazin-3-yl)-6-methoxy-6-methylhydrouracil. |
| 6-methyl-3-(2-methylthiazolidin-3-yl)uracil. | do | 5,5-dichloro-6-methoxy-6-methyl-3-(2-methylthiazolidin-3-yl)hydrouracil. |
| 6-methyl-3-(4-thiazolin-3-yl)uracil | Ethanol | 5,5-dichloro-6-ethoxy-6-methyl-3-(4-thiazolin-3-yl)hydrouracil. |
| 3-(hexahydro-3-benzothiazolinyl)-6-methyluracil. | do | 5,5-dichloro-6-ethoxy-3-(hexahydro-3-benzothiazolinyl)-6-methylhydrouracil. |
| 3-(3-benzothiazolinyl)-6-methyluracil | do | 3-(3-benzothiazolinyl)-5,5-dichloro-6-ethoxy-6-methylhydrouracil. |
| 3-(3,4-dihydro-2H,1,4-benzothiazin-4-yl)-6-methyluracil. | do | 5,5-dichloro-3-(3,4-dihydro-2H-1,4-benzothiazin-4-yl)-6-methylhydrouracil. |

The following compounds can be similarly prepared by mixing the appropriately substituted uracil starting reagent and carrying out the reactions in methanol.

2-(3-azabicyclo[3.2.2]nonan-3-yl)-5,5-dichloro-6-methoxy-6-methylhydrouracil 3-(1-benzimidazolyl)-5,5-dichloro-6-methoxy-6-methylhydrouracil 5,5-dichloro-3-(4-hydroxy-4-pipecolin-1-yl)-6-methoxy-6-methylhydrouracil 5,5-dichloro-3-(2,5-dimethylpiperazin-1-yl)-6-methoxy-6-methylhydrouracil 5,5-dichloro-3-(3-hydroxypiperidin-1-yl)-6-methoxy-6-methylhydrouracil 5,5-dichloro-3-[(2-hydroxy-1,1-dimethylethyl)-1-pyrrolidinyl]-6-methoxy-6-methylhydrouracil Example 2.—5,5-dibromo-3-(hexahydro-1-azepinyl)-6-hydroxy-6-methylhydrouracil A suspension of 7.4 parts by weight of 3-(hexahydro-1-azepinyl)-6-methyluracil in 100 parts of water is stirred at 20–25° C. while 15.6 parts of bromine is added over about 10 minutes. The slurry is stirred an additional hour then filtered and the solid washed well with water. The resulting 5,5-dibromo - 3 - (hexahydro - 1 - azepinyl)-6-hydroxy-6-methylhydrouracil is sufficiently pure for herbicidal formulation.

By substituting equivalent amounts of the appropriate starting uracil for the 3-(hexahydro-1-azepinyl)-6-methyluracil set forth above, the hydrouracils of Table II can be prepared.

TABLE II

| Starting uracil | Hydrouracil product |
| --- | --- |
| 3-(hexahydro-1-azepinyl)-6-ethyluracil. | 5,5-dibromo-6-ethyl-3-(hexahydro-1-azepinyl)-6-hydroxy-hydrouracil. |
| 6-methyl-3-(4-morpholino)uracil. | 5,5-dibromo-6-hydroxy-6-methyl-3-(4-morpholino)hydrouracil. |
| 6-methyl-3-(1-piperidino)uracil. | 5,5-dibromo-6-hydroxy-6-methyl-3-(1-piperidino)hydrouracil. |
| 6-ethyl-3-(1-piperidino)uracil. | 5,5-dibromo-6-ethyl-6-hydroxy-3-(1-piperidino)hydrouracil. |
| 6-methyl-3-(1-pyrrolidinyl)uracil. | 5,5-dibromo-6-hydroxy-6-methyl-3-(1-pyrrolidinyl)hydrouracil. |
| 3-(dihydro-1,3,5-dithiazin-5-yl)-6-methyluracil. | 5,5-dibromo-3-(dihydro-1,3,5-dithiazin-6-hydroxy-6-methylhydrouracil. |
| 6-methyl-3-(1,2,3,6-tetrahydro-1-pyridyl)uracil. | 5,5-dibromo-6-hydroxy-6-methyl-3-(1,2,3,6-tetrahydro-1-pyridyl)hydrouracil. |
| 6-ethyl-3-(4-methyl-1-piperazinyl)uracil. | 5,5-dibromo-6-ethyl-6-hydroxy-3-(4-methyl-1-piperazinly)-hydrouracil. |
| 3-(2,5-dimethyl-4-morpholino)-6-methyluracil. | 5,5-dibromo-3-(2,5-dimethyl-4-morpholino)-6-hydroxy-6-methylhydrouracil. |
| 6-methyl-3-(1-pyrrolyl)uracil. | 5,5-dibromo-6-hydroxy-6-methyl-3-(1-pyrrolyl)hydrouracil. |
| 3-(3-azabicyclo[3.2.2]nonan-3-yl)-6-methyluracil. | 3-(3-azabicyclo[3.2.2]nonan-3-yl)-5,5-dibromo-6-hydroxy-6-methylhydrouracil. |
| 6-methyl-3-(2-methyl-3-oxazolidinyl)uracil. | 5,5-dibromo-6-hydroxy-6-methyl-3-(2-methyl-3-oxazolidinyl)-hydrouracil. |
| 3-(3-benzoxazolinyl)-6-methyluracil. | 3-(3-benzoxazolinyl)-5,5-dibromo-6-hydroxy-6-methylhydrouracil. |
| 3-(3-benzothiazolinyl)-6-methyluracil. | 3-(3-benzothiazolinyl)-5,5-dibromo-6-hydroxy-6-methylhydrouracil. |

The following examples illustrate preparation and use formulations incorporating the herbicidally active compounds of the invention.

Example 3

Aqueous suspension: Percent
   5,5 - dichloro - 3 - (hexahydro - 1 - azepinyl)-6-ethoxy-6-methylhydrouracil _____ 28.0
   Sodium lignin sulfonate _____ 15.0
   Hydrated attapulgite _____ 2.0
   Disodium phosphate _____ 0.8
   Sodium pentachlorophenate _____ 0.5
   Water _____ 53.7

The above dry ingredients are ground to pass a 30-mesh screen and are then mixed and pebble-milled or sand-milled with the remainder of the ingredients until the average particle size of the active material is substantially less than 5 microns. The resulting stable thixotropic suspension does not cake, and can be readily diluted with water to form a dilute, very slowly settling suspension which requires no agitation during application.

This aqueous suspension, applied as a directed spray at 2 to 4 pounds of active ingredient per acre in 30 gallons of water, gives good pre-emergence control of barnyard-grass, foxtail, crabgrass, and jungle rice grass growing along the edge of sugar cane fields.

Example 4

Aqueous dispersion: Percent
   5,5 - dichloro - 6 - methoxy - 6 - methyl-3-(1-piperidino)hydrouracil _____ 13.00
   Pentachlorophenol _____ 16.00
   Sodium lignin sulfonate _____ 15.00
   Hydrated attapulgite _____ 1.75
   Water _____ 54.25

This formulation is wet-milled until the particles are substantially all below 10 microns in size, to yield a stable dispersion. An application of this formulation in 40 gallons of water at the rate of 35 pounds (active) per acre gives control of annual and perennial broadleaf and grass weeds such as wild mustard, chickweed, foxtail and crabgrass in fire-break paths.

Example 5

Oil concentrate: Percent
   5,5-dichloro-6-ethoxy-6-methyl-3-(1-pyrrolidinyl)hydrouracil 1:1 complex with meta-cresol ___ 25
   Heavy aromatic naphtha _____ 75

The oil concentrate is prepared by dissolving the active in the oil. The concentrate can be easily diluted to use levels with herbicidal oils and sprayed.

Four pounds of active ingredient per acre in 40 gallons of oil gives excellent pre-emergence control of foxtail, barnyard grass, and Johnson grass seedlings. These formulations, at 45 pounds of active ingredient per acre, are also useful for general control of annual and perennial weeds on industrial sites and railroad ballast.

Example 6

Emulsifiable oil: Percent
   5,5 - dibromo - 6 - hydroxy - 6 - methyl-3-(1-piperidino)hydrouracil _____ 20.0
   Alkyl aryl polyether alcohol _____ 2.5
   Oil soluble petroleum sulfonate _____ 2.5
   Methyl isobutyl ketone _____ 65.0

The emulsifiable oil is prepared by mixing the above components until a homogeneous solution results. It can then be emulsified in water for application.

This emulsifiable oil is useful for weed control on railroad rights-of-way, in railroad yards, and on sidings. When this composition is diluted with 100 gallons of water per acre and sprayed from a railroad spray train at 15 pounds of active ingredient per acre, mixed vegetation such as crabgrass, quack grass, bromegrass, ragweed, cockleburr, lamb's-quarters, and mares' tail is controlled for an extended period.

Example 7

Emulsifiable oil suspension: Percent
   5,5 - dichloro - 6 - methyl - 6-methoxy-3-(4-morpholino)hydrouracil _____ 25
   Blend of polyalcohol carboxylic acid esters and oil-soluble petroleum sulfonates _____ 6
   Diesel oil _____ 69

The above components are mixed together, and milled in a roller mill, pebble mill, or sand mill until the particles of the active component are substantially all below 10 microns in size. The resulting suspension can be emulsified in water or diluted further with weed oils for spray application.

This formulation is diluted with 80 gallons of Lion Herbicidal Oil No. 6 and applied at 15 to 25 pounds of active ingredient per acre for the control of weeds such as morning glory, chickweed, pigweed, lamb's-quarters, yarrow, ragweed, wilk carrot, quack grass, witchgrass, Indian grass, and willow, oak, and maple seedlings growing along railroads. Excellent control is obtained.

15

Example 8.—Tank mixes (A) Fourteen pounds of 5,5-dichloro-6-ethoxy-6-methyl-3-(hexahydro-1-azepinyl)hydrouracil as an 80% wettable powder and 3 pounds of 4,6-dinitro-ortho-secondary butylphenol in 4 gallons of oil are blended as a tank mix and applied at 17 pounds of active herbicide per acre in 100 gallons of water to weeds growing along boardwalks. Excellent kill of annual and perennial broadleaf and grass weeds is obtained.

(B) Eighteen pounds of an 80% water-dispersible powder formulation of 5,5-dibromo-6-ethyl-6-hydroxy-3-(4-morpholino)hydrouracil and 24 pounds of 2,2-dichloropropionic acid, sodium salt, 85% are dispersed and mixed in 100 gallons of water.

This composition is used for the control of perennial grasses and broadleaf weeds on railroad rights-of-way. An application of 100 gallons of this formulation per acre gives good control of seedling Johnson grass, Bermuda grass, nut sedge, foxtails, crabgrass, chickweed, ragweed, and beggar-ticks.

(C) Twenty-five pounds of an 80% water dispersible powder formulation of 3-[azabicyclo (3.2.2)nonan-3-yl]-5,5 - dichloro - 6 - methoxy-6-methylhydrouracil and 25 pounds of 2,2-dichloropropionic acid, sodium salt (85%) are dispersed and mixed in 50 to 100 gallons of water. This composition, sprayed on one acre, gives good control of both annual and perennial grasses and broadleaf weeds growing along railroad rights-of-way and around loading dock installations.

Such difficult-to-kill weeds as crabgrass, curly dock, ragweed, pigweed, goatweed, carpetweed, yarrow, lamb's-quarters, beggar-ticks, Spanish needle, nightshade, black medic, knotweed, plantain, spotted spurge, and velvetleaf are controlled by this application.

(D) Fifteen pounds of 5,5-dichloro-3-(2,5-dimethylpiperazin-1-yl)-6-methoxy - 6 - methylhydrouracil as an 80% wettable powder and 35 pounds of ammonium sulfamate are blended as a tank mix.

This composition controls annual and perennial weeds around oil tanks and along roadsides.

An application of 50 pounds per acre (active) in 100 gallons of water controls annuals and perennial broadleaf and grass weeds, giving contact action and residual weed control. Weeds controlled by this treatment include crabgrass, Muhlenbergia, broom sedge, cockleburr, ragweed, flower-of-an-hour, and oak, maple, and sweet gum seedlings.

SOLID COMPOSITIONS

Example 9

Wettable powder: Percent
5,5 - dichloro - 3 - (hexahydro-1-azepinyl)-6-methoxy-6-methylhydrouracil _____ 90.0
Alkyl naphthalene sulfonate, Na salt _____ 2.0
Low viscosity methyl cellulose _____ 0.3
Attapulgite clay _____ 7.7

These components are blended and micropulverized until the particles of uracil have been reduced below 50 microns in diameter, then reblended.

This formulation gives excellent weed control when applied pre-emergence or early post-emergence at rates of 4–6 pounds per acre to crabgrass, wild oats, wild mustard, volunteer alfalfa, foxtail, and lamb's-quarters.

Example 10

Granules: Percent
5,5-dichloro-6-butoxy - 6 - methyl-3-(tetrahydro-1,4-thiazin-4-yl)hydrouracil _____ 10
Attapulgite granules (15–30 mesh) _____ 90

The active component is dissolved in warm xylene to give a 25% solution which is sprayed on the clay granules which are tumbled in a mixer.

After removal of the solvent, the granules are ready for application.

16

The granules are applied conveniently by hand for spot treatment of undesirable bunch grasses growing in agricultural areas. An application of 25 pounds of active ingredient per acre gives good control of orchard grass, purpletop, and Kentucky 31 fescue.

Example 11

Pellets or granules: Percent
3 - (1-aziridinyl)-5,5-dichloro-6-ethyl-6-methoxyhydrouracil _____ 25
Anhydrous sodium sulfate _____ 10
Sodium lignin sulfonate _____ 10
Non-swelling sub-bentonite clay _____ 55

The components are blended and micropulverized, then moistened with 18–20% water and extruded through die holes. The extrusions are cut as formed to give pellets and dried. Granules can also be obtained by passing the extrusions through a Stokes granulator fitted with the desired screens.

These pellets or granules are useful for weed control along highway guard rails, around utility poles, around bridges, Cyclone fences, and highway signs. They are applied conveniently by hand methods at 15 to 30 pounds of active ingredient per acre. Excellent control of seedling stands such as oak, maple, sweet gum, and willow is obtained. Good control of veronica, ragweed, lamb's-quarters, foxtail, chickweed, henbit, and crabgrass.

Example 12

Wettable powder: Percent
5,5-dibromo-6-hydroxy - 6 - methyl-3-(1-piperidino)hydrouracil _____ 80.0
Sodium lauryl sulfate _____ 0.6
Sodium lignin sulfonate _____ 2.0
Kaolin clay _____ 17.4

The components are blended and then micropulverized until the solids are substantially all below 50 microns in particle size. The mixture is then reblended until it is homogeneous.

This wettable powder is used as a general purpose weed killer on industrial sites and railroad ballast. Fifteen to twenty-five pounds of active ingredient per acre in 100 gallons water gives excellent control of evening primrose, pokeweed, oxeye daisy, cockleburr, goose grass, foxtail, crabgrass, and love grass.

Example 13

Wettable powder: Percent
5,5 - dichloro-6-ethoxy-6-methyl-3-(1-piperidino)hydrouracil _____ 50
Sodium alkylnaphthalenesulfonate _____ 2
Sodium lignin sulfonate _____ 2
Attapulgite clay _____ 46

The components are blended and then micro-pulverized until the solids are substantially all below 50 microns in particle size. The mixture is then reblended until it is homogeneous. Application of this formulation at a rate of 30 pounds (active) in 80 gallons of water per acre controls annual and perennial broadleaf and grass weeds such as quack grass, giant foxtail, ragweed, and lamb's-quarters.

The compounds of Examples 1 and 2 can be formulated in similar fashion and applied with similar results.

I claim:
1. A compound of the formula

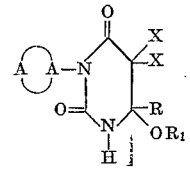

wherein

is azacycloalkyl of 3 through 8 ring atoms, azacycloalkenyl of 5 through 7 ring atoms, azabicycloalkyl of 7 through 11 ring atoms, azabicycloalkenyl of 9 through 11 ring atoms, diazacycloalkyl of 5 through 8 ring atoms, diazobicycloalkenyl of 7 through 11 ring atoms, azaoxacycloalkyl of 5 through 8 ring atoms, azaoxacycloalkenyl of 5 through 8 ring atoms, azaoaxabicycloalkyl of 8 through 10 ring atoms, azadioxacycloalkyl of 5 through 8 ring atoms, azaoxabicycloalkenyl of 9 through 11 ring atoms, azathiacycloalkyl of 5 through 7 ring atoms, azathiacycloalkyenyl of 5 through 7 ring atoms, azadithiacycloalkyl of 5 through 8 ring atoms, azathiabicycloalkyl of 9 and 10 ring atoms, or azathiabicycloalkenyl of 9 and 10 ring atoms; provided that the

group can be substituted with a member selected from the group consisting a hydroxy, alkyl or 1 through 4 carbon atoms, and hydroxyalkyl of 1 through 4 carbon atoms; X is chlorine or bromines; R is methyl or ethyl; $R_1$ is hydrogen or alkyl of 1 through 4 carbon atoms; provided that when $R_1$ is alkyl, X is chlorine and when $R_1$ is hydrogen, X is bromine or the addition compounds thereof with Lewis acids.

2. A compound of the formula

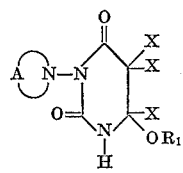

wherein

is azacycloalkyl of 5 through 7 ring atoms or azaoxycycloalkyl of 5 and 6 ring atoms; provided that the

group can be substituted with a member selected from the group consisting of hydroxy, alkyl of 1 through 4 carbon atoms, and hydroxy alkyl of 1 through 4 carbon atoms; X is chlorine or bromine; R is methyl or ethyl; $R_1$ is hydrogen or alkyl of 1 through 4 carbon atoms; provided that when $R_1$ is alkyl, X is chlorine and when $R_1$ is hydrogen, X is bromine.

3. The compound of claim 1 which is 5,5-dichloro-3-(hexahydro-1-azepinyl)-6-methoxy-6-methylhydrouracil.

4. The compound of claim 1 which is 5,5-dibromo-6-hydroxy-6-methyl-3-(1-piperidino)hydrouracil.

5. The compound of claim 1 which is 5,5-dichloro-6-methoxy-6-methyl-3-(1-piperidino)hydrouracil.

6. The compound of claim 1 which is 5,5-dibromo-6-hydroxy-6-methyl-3-(1-pyrrolidinyl)hydrouracil.

7. The compound of claim 1 which is 5,5-dichloro-6-methoxy-6-methyl-3-(1-pyrrolidinyl)hydrouracil.

8. The compound of claim 1 which is 5,5-dibromo-3-(hexahydro-1-azepinyl)-6-hydroxy-6-methylhydrouracil.

9. The compound of claim 1 which is 5,5-dichloro-6-methoxy-6-methyl-3-(1-piperazinyl)hydrouracil.

10. The compound of claim 1 which is 5,5-dichloro-6-methoxy-6-methyl-3-(4-morpholino)hydrouracil.

No references cited.

ALEX MAZEL, Primary Examiner

JOSE TOVAR, Assistant Examiner

U.S. Cl. X.R.

71—90, 92; 260—243, 244, 247.1, 256.4, 256.5; 424—246, 248, 251